United States Patent [19]
Walters et al.

[11] 3,854,382
[45] Dec. 17, 1974

[54] HYDRAULIC ACTUATOR CONTROLS
[75] Inventors: Ronald Bernard Walters, Wembley; Peter Michael Hamey, Emsworth, both of England
[73] Assignee: Sperry Rand Limited, London, England
[22] Filed: June 20, 1973
[21] Appl. No.: 371,861

[52] U.S. Cl............... 91/433, 91/459, 91/461
[51] Int. Cl..................... F15b 11/10, F15b 13/043
[58] Field of Search............................ 91/433, 461

[56] References Cited
UNITED STATES PATENTS
3,763,746  10/1973  Walters.............................. 91/433

Primary Examiner—Paul E. Maslousky
Attorney, Agent, or Firm—Barnes, Kisselle, Raisch & Choate

[57] ABSTRACT

A device for controlling the pressure of fluid applied to or the flow of fluid to a hydraulic actuator comprises a pressure control pilot valve for controlling a pressure operated main valve. A transducer converts an electrical input signal into a force which is applied to the pilot valve spool. A feedback pressure is applied to piston means on or associated with the spool to apply a force thereto in opposition to the first-mentioned force. For pressure control a shuttle valve, responsive to the direction of movement of the load applies to the pressure control pilot valve a pressure difference equal to the pressure difference between the higher and lower operating pressures of the actuator. For flow control a flow sensor produces a feedback pressure differential dependent on the flow of fluid to the actuator and this pressure differential is applied to a flow control pilot valve adapted to control the main valve.

Pressure and flow control can be optionally obtained by providing two pilot valves in series, one responsive to the pressure sensing shuttle valve and the other responsive to the flow sensor. One of the pilot valves is set to override the feedback signal thereto, whereby the other pilot valve becomes effective as desired.

10 Claims, 4 Drawing Figures

3,854,382

HYDRAULIC ACTUATOR CONTROLS

This invention relates to hydraulic actuator controls.

It is one object of the invention to provide directional and modulated control of load pressure drop across a hydraulic actuator by means of remote electrical signals.

It is another object of the present invention to provide directional and modulated flow control of a hydraulic actuator by means of remote electrical signals. It is desirable that the controlled output be unaffected by disturbances such as variations in load supply pressure or the temperature.

It is a further object of the present invention to combine flow control with a pressure limiting factor derived from a pressure actuated control system.

In pending U.S.A. Patent Application Ser. No. 179,997 filed Sept. 13, 1971 for "Hydraulic Actuator Controls" and now issued as U.S. Pat. No. 3,763,746, there is described a device for optionally controlling the flow of fluid to or the pressure of fluid applied to a double acting hydraulic actuator comprising fluid pressure operated main control valve means for regulating the fluid flow to and from the actuator; serially connected first and second pilot valve means for controlling the main control valve, each of said pilot valve means including spool means for regulating the fluid supply for operating the main control valve means; first and second transducer means for producing a respective input force dependent on a respective electrical input signal and for applying such force to the respective spool means; first opposed piston means associated with said first pilot valve spool means; second opposed piston means associated with said second pilot valve spool means; flow sensing means for producing a pressure differential dependent on the rate of fluid flow to the actuator; pressure sensing means for producing a feedback pressure differential dependent on the pressure difference operating on the actuator; first feedback means for applying said flow dependent pressure differential to said first opposed piston means to apply to said first pilot valve spool means a first feedback force opposed to the respective input force; and second feedback means for applying said pressure dependent feedback pressure differential to said second opposed piston means to apply to said second pilot valve spool means a second net feedback force opposed to the respective input force when the first transducer means is set to normally override the first feedback force, the first feedback force being effective when the second transducer means is set to normally override the second feedback force.

Thus, when the second pilot valve means is set by its transducer to a limiting position in which hydraulic fluid is applied to the first pilot valve means, the device may be used in a flow control mode for controlling the speed of operation of the actuator. Alternatively, with the first pilot valve means used in one or other of its end positions as a directional control valve, the second pilot valve means may be used for controlling the force applied by the hydraulic actuator in accordance with a pressure control mode of the device. Also, the device may be used in a flow control mode with a maximum pressure override set by the energisation of the second transducer means. However, it may happen that, when operating in accordance with the pressure control mode or in accordance with the flow control mode with maximum pressure override, the load will overrun the actuator. Under such circumstances, the pressure difference across the actuator would be applied to the second pilot valve means in a direction to provide an undesired throttling effect. In other words, the second pilot valve means would interfere with the flow control mode.

In accordance with the present invention, the pressure sensing device comprises a shuttle valve whose housing has inlet ports connected to the hydraulic actuator and outlet ports and contains a valve piston movable responsively to pressures in chambers connected to the fluid supply for operating the main control valve to connect the inlet ports alternately to the outlet ports such that one of the outlet ports is always subjected to the operating pressure at the side of the double acting actuator being supplied with fluid and the other is always subjected to the operating pressure at the side of the double acting actuator from which fluid is being withdrawn.

The invention is further described, by way of example, with reference to the accompanying drawings, in which.

Figure 1:
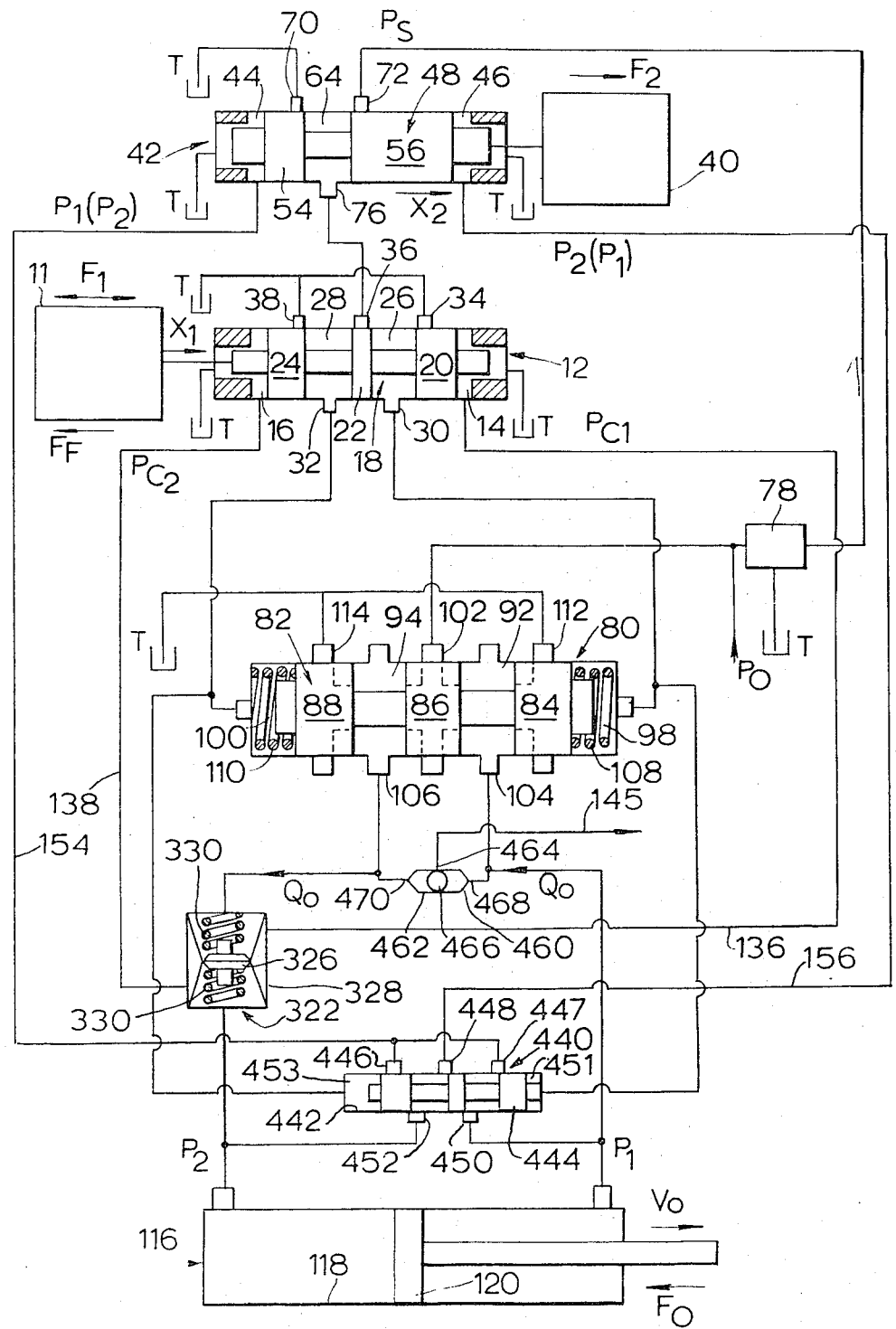
FIG. 1 is a circuit diagram of a multiple control valve in accordance with the invention.

In FIG. 1 there is shown the circuit diagram of a multiple control valve by which the flow and pressure of hydraulic fluid supplied to an actuator may be controlled. The multiple control valve is conveniently of modular construction and comprises the following subunits:

1. A flow control pilot valve 12;
2. A pressure control pilot valve 42;
3. A main control valve (main stage) 80;
4. A flow sensor 322; and
5. A direction responsive shuttle valve 440;

The shuttle valve is in the housing of the main stage. In an alternative arrangement both the flow sensor and the shuttle valve can be incorporated in the housing of the main stage or in a so-called sandwich plate which is interposed between the main stage and either an adapter block or a manifold.

Referring to FIG. 1 in detail, the flow control pilot comprises a linear force motor 11 which produces a force of appropriate polarity porportional to an electrical input current and a 4-way throttle valve 12 having feed back chambers 14, 16 of equal area at opposite ends of the spool 18. The spool carries three lands 20, 22, 24 which define between them two chambers 26, 28. Fluid ports 30, 32 are provided from the chambers 26, 28 for supplying fluid to and/or receiving fluid from a subsequent stage. Three further fluid ports 34, 36, 38 are provided which are closed by the three lands 20, 22, 24 respectively when the spool 18 is in its central position (that shown in FIG. 1).

The pressure control pilot comprises a second linear force motor 40 which produces a force proportional to an input electrical current and a 3-way throttle valve 42 having differential feedback chambers 44, 46 at opposite ends of the spool 48. The spool carries two lands 54, 56 which between them define a chamber 64. The effective areas on the ends of the lands 54 and 56 on which fluid pressures in the chambers 44, 46 act are equal but fluid pressures in the two feedback chambers act in opposite directions.

Fluid ports 70, 72 are blocked by lands 54, 56 when the spool 48 occupies its illustrated central position. A further fluid port 76 communicates with the chamber 64.

Fluid ports 34 and 38 of pilot 12 are both connected to tank and fluid port 36 is connected to fluid port 76.

Fluid under pressure $P_s$ is supplied from a pressure source such as a pump (not shown) via a pressure regulating valve 78 to port 72 of pilot 42, and port 70 of pilot 42 is connected to tank, i.e., a reservoir of hydraulic fluid from which the pump draws its supply.

The main stage comprises a pilot operated 4-way throttle valve 80 containing a spool 82 having three notched lands 84, 86, 88 therein. A further description of the land construction can be found in the above-mentioned pending patent application. The three lands define two chambers 92, 94 therebetween and the outer ends of the lands 84 and 88 are subjected to the fluid under pressure in pilot flow control chambers 98, 100 of equal area at opposite ends respectively of the valve 80. The pilot flow control chambers 98, 100 are supplied with hydraulic fluid under pressure from ports 30, 32 respectively of pilot 12.

The valve 80 includes a port 102 which is supplied with fluid under pressure at $P_o$. This may be, for example, supplied from the same pump (not shown) which supplies port 72. Further ports 112, 114 are connected to tank. The ports 112, 102 and 114 are covered by the lands 84, 86, 88, respectively, when the spool 82 occupies a central position normally adopted by the spool at zero input signal by virtue of springs 108, 110 respectively at opposite ends of the spool. Main flow ports 104, 106 communicate with the chambers 92, 94 respectively.

Hydraulic fluid from the main stage is supplied to a double acting actuator 116, comprising a cylinder 118 and a piston 120, through a flow sensor device generally designated 322. The flow sensor comprises a baffle 326 located by springs 330 and displaceable in a housing 328 against one or other of the springs 330 by the fluid flowing to or from the actuator 116. The interior of the housing 328 is so shaped that the pressure drop across the baffle 326 is proportional to the rate of flow of fluid through the sensor. The pressures at the opposite sides of the baffle 326 are applied by lines 136, 138 to the feedback pressure chambers 14 and 16 of flow pilot 12. A fuller description of the flow sensor 322 can be found in the above-mentioned pending patent application. The flow sensor can be incorporated in the main valve body.

According to the present invention, the shuttle valve 440 is responsive to the pressure difference across the main stage valve 80 rather than the pressure difference across the actuator 116. The shuttle valve 440 includes a cylinder 442 in which a valve piston 444 is slidable. The shuttle valve 440 has two inlet ports 450 and 452 connected respectively to the right and left hand sides of the hydraulic actuator 116 and outlet ports 446, 447 and 448 of which the ports 446 and 447 are connected by line 154 to the left hand feedback chamber 44 of the throttle valve 42 and the port 448 is connected by line 156 to the right hand feedback chamber 46 of this throttle valve. The valve piston 444 has three lands such that when it is in its right hand illustrated position, the ports 450 and 452 are connected respectively to the ports 447 and 448, so that the pressures $P_1$ and $P_2$ to the right and left hand sides of the actuator piston 120, respectively, are applied respectively to the left and right hand chambers 44 and 46 of the pressure pilot 42. When the valve piston 444 is moved over to its left hand position, the ports 450 and 452 are connected respectively to the ports 448 and 446 so that the pressures $P_1$ and $P_2$ are applied respectively to the right hand and left hand chambers 46 and 44. The valve piston 444 is moved responsively to the pressure difference between chambers 451 and 453 at its right and left hand ends. The chambers 451 and 453 are connected respectively to the chambers 98 and 100 of the main stage 80.

FIG. 1 illustrates the multiple control valve in its neutral state. To enable the multiple control valve to operate in a so-called flow control mode the force motor 40 is fully energised to move the spool 48 fully to the right whereby the supply pressure $P_s$ is applied via the ports 72 and 76 to the port 36 of the flow control pilot 12 of which the ports 34 and 38 are connected directly to tank. To explain the sequence of operation it is assumed that the actuator is initially at rest and is required to move at a velocity $V_o$ in the direction indicated in FIG. 1. To initiate the sequence a reference current proportional to the required velocity $V_o$ and a polarity corresponding to the required direction is caused to flow in force motor 11. The resulting out of balance force $F_1$ will cause the spool 18 of pilot 12 to move through a distance $X_1$, say to the right, and this in turn will allow flow of oil from port 36 through chamber 28 and port 32 to the pilot chamber 100 of the main stage. Displaced fluid from the opposite pilot chamber 98 will return via port 30, chamber 26 and port 34 of pilot 12 to tank.

The throttling action of the main valve 80 controls the main flow $Q_o$ to and from the actuator 116. The fluid flow to or from left hand end of the actuator has to pass through the flow sensor 322 which generates a differential pressure proportional to the controlled flow. Thus, a pressure $P_{c1}$ is generated in the fluid line 136 and a pressure $P_{c2}$ is generated in the fluid line 138. The pressures $P_{c1}$ and $P_{c2}$ are applied to the respective feedback chambers 14, 16 of pilot 12. The difference between $P_{c1}$ and $P_{c2}$ (i.e., $P_F = P_{c1} - P_{c2}$) acts across the pilot valve 12 and sets up a restoring force $F_F$ on the spool 18 tending to null the throttling effect of the valve thereby blocking the flow of oil to the main control valve. In the equilibrium condition, output flow $Q_o$ will be directly proportional to the current applied to the force motor 11.

It will be appreciated that the valve 12 can be made to function solely as a flow control valve without using pilot 42 if a fluid connection between the output from the pressure regulating valve 78 and the port 36 is provided. Thus, if a flow control valve only is required, pilot 42 and also the shuttle valve 440 may be dispensed with.

In the pressure control mode of operation of the multiple control valve, the normal direction of flow of fluid to and from the actuator and therefore the normal direction of movement of the actuator is determined by the setting of pilot 12. If current of appropriate polarity is applied to force motor 11 so that spool 18 moves completely to the left, the actuator will move in one direction upon displacement of the spool 48 from its illustrated central position and if current of appropriate polarity is applied to the force motor 11 so that the spool 18 is caused to move completely to the right then the actuator will move in the opposite direction upon displacement of the spool 48 of pilot 42.

The actuator piston 120 is initially considered to be moving in the direction shown by the arrow $V_o$ against an opposing load by appropriate energisation of force motors 11 and 40. Let us suppose it is required to increase the opposing load to a new value $F_o$. The sequence is initiated by increasing the current supplied to the force motor 40, the direction of movement of the actuator being determined (as described above) by the polarity of the current applied to the force motor 11. Thus, while the system is in the pressure control mode of operation, pilot 12 acts as a directional control valve only.

The force $F_2$, out of balance as a result of the increased electric current applied to force motor 40, will displace the spool 48 of pilot 42 through a distance $X_2$ and this in turn will allow flow of fluid into one and out of the other control chamber 98, 100 of the main valve 80, causing the main valve spool to be displaced in a direction to decrease the throttling action of the main valve spool which controls the main valve flow $Q_o$ to and from the actuator 116. The resulting increased actuator velocity acting in accordance with the load resistance characteristics will tend to increase the opposing load acting on the actuator which in turn will increase its load pressure drop.

Since the shuttle valve 440 is switched by the control pressures applied to the main stage 80 the valve piston 444 adopts a right hand or left hand position according as to whether the main stage spool 82 is displaced to the right or to the left of centre, i.e., according as to whether the load is moving to the right or to the left.

$P_1$ is shown as being applied via shuttle valve 440 and fluid line 154 to feedback chamber 44 of pilot 42 at the end of the spool 48 opposite to that connected to the force motor 40. $P_2$ is applied via the shuttle valve 440 and the fluid line 156 to the feedback chamber 46 in pilot 42. The area of the annular face of the land 56 is equal to the area of the annular face of the land 54 in chamber 44. Thus, the restoring force acting on spool 48 and force motor 40 is directly proportional to the load pressure drop across the actuator. In an alternative arrangement, the feedback chambers 44, 46 can take the form of bias pistons having areas in the ratio 1 to 1.

When the restoring force balances the force exerted by the force motor 40, the spool 48 of flow pilot 42 will tend to null thus blocking the flow of fluid to the main valve chamber 98 or 100. If the restoring force momentarily exceeds the input force from the force motor 40, pilot valve 42 will connect the main valve control chamber 98 to tank as well as the control chamber 100. The main valve spool 82 is then returned towards its neutral position by the centering springs 108, 110, whereby the main flow $Q_o$ is reduced. The resulting drop in resistance $F_o$ will in turn reduce the load pressure drop and the consequent reduction of the restoring force acting on the force motor 40 will re-establish the equilibrium conditions. Sufficient damping is provided to prevent oscillation.

The setting of pilot 12 determines the direction of movement of the actuator 116. The rate of change of movement of the actuator 116 depends upon the force $F_2$ of the force motor 40 in relation to the load $F_o$ on the actuator 116. Since the restoring force acting on the spool 48 of pilot 42 in the pressure control mode of operation is directly proportional to the pressure difference across the actuator piston 120, the operation of pilot 42 is unaffected by asymmetrical pressure drop characteristics of the main stage arising from lap tolerance build up.

The pressure control pilot 42 may be used to obtain maximum pressure override when operating in the flow control mode. In this case the energisation of the second force motor 40 is set to correspond to the maximum desired pressure drop across the load actuator 116 whilst the force motor 11 is used to control the flow. The pilot valve 42 then serves as a throttle valve to limit the pressure drop $P_1-P_2$ irrespective of the operation of the pilot valve 12.

If the hydraulic actuator is moving, say, to the right, in the flow control mode with pressure limitation then it is an inherent feature that the main stage valve spool 82 has been moved to the right under a pressure in the flow control chamber 100 greater than the pressure in the right hand flow control chamber 98. It, therefore, follows that the valve piston 444 will be moved to its illustrated right hand position, even if the load should be overrunning the actuator 116 so that the pressure $P_1$ is greater than the pressure $P_2$. The pressure differential $P_1$ minus $P_2$ will then be applied to the spool 48 of pilot 42 tending to open the pilot valve and thereby prevents undesirable interference with the flow control mode of operation with pressure limitation when the load is overrunning the actuator. Normal function of pilot 12 for flow control is unaffected by the shuttle valve 444 or pilot 42.

Similarly, the normal function of pilot 42 for pressure control or limiting of opposing loads is unaffected.

The higher of the two pressures $P_1$ and $P_2$ can also be used for adjusting the supply pressure $P_o$ in relation to the load pressure drop $P_L$.

In the case wherein the pump is a variable volume pump this is achieved by acting on the stroke control mechanism. In the case wherein the pump is a fixed displacement pump this is achieved by acting on the pressure relief valve which controls the main supply pressure $P_o$. A pump control line 145 is connected via a separate auxiliary shuttle valve 460 to whichever of the ports 104 and 106 of the main stage 80 is at the higher pressure. The shuttle valve 460 comprises a cylinder 462 having a central outlet port 464 to which the pump control line 145 is connected and a free piston 466 such as a ball movable in the cylinder to close one or other of two inlet ports 468 and 470 connected respectively to the ports 104 and 106.

Figure 2:
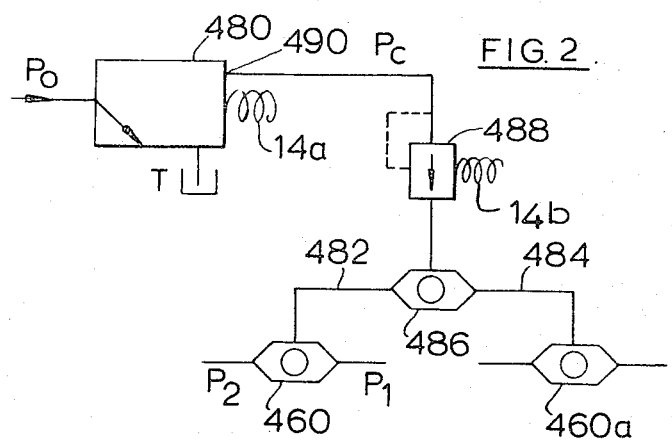
FIG. 2 is a diagram of a pressure matching device connected to the source of hydraulic fluid under pressure.

FIG. 2 shows how pressure matching to the highest of the pressures of several simultaneously acting loads may be achieved by means of a pressure relief valve 480 which is connected to the pump supply pressure $P_o$ and a pilot relief valve 488 which is connected to a vent port 490 of the valve 480 and which acts in the manner of a pressure reducing valve. The higher of the pressures $P_1$ and $P_2$ from one actuator is applied via the shuttle valve 460 to a line 482 and the higher of the pressures applied to another actuator supplied from the same source, but controlled by a separate multiple control valve, is applied via a shuttle valve 460a to a line 484. The lines 482 and 484 are connected to opposite ends of a shuttle valve 486 by which the outlet from the pilot relief valve 488 is connected to that one of the lines 482 and 484 at the higher of the two pressures. The valve 480 may correspond to that illustrated and described in British Patent Specification No. 1,109,261. The pressure $P_o$ is determined either by the pressure $P_r$ at the port 490 or by the force of a spring 14a, whichever is the lower, so that when the pressure $P_o$ exceeds the highest load pressure $P_1$ or $P_2$ by an amount determined by the force of a spring 14b of the pilot relief valve 488 the pump is unloaded to drain through the relief valve 480.

Since the valve pressure drop under positive loading is given by $P_v = 2 (P_o - P_1)$ in one direction and $P_v = 2 (P_o - P_2)$ when the actuator moves in the opposite direction, the pre-load of the spring 14b will provide a pressure corresponding to one half of the maximum specified main stage pressure drop. The force of the spring 14a determines the highest attainable supply pressure $P_o$.

Figure 3:
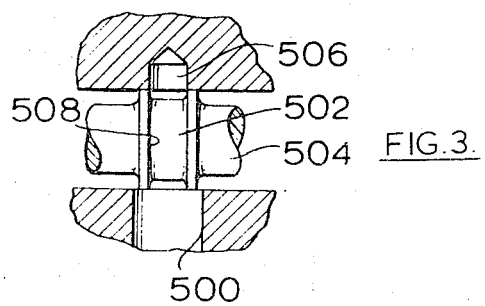
FIG. 3 is a fragmentary detail of one of the ports of one of the pilot valves.
Figure 4:
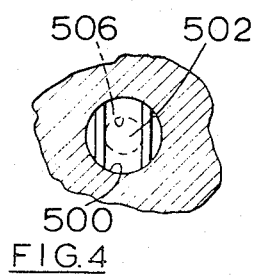
FIG. 4 is a detail sectional elevation of the port.

FIGS. 3 and 4 show a port construction suitable for either of the pilot valves 11 and 42. The port comprises a bore 500 whose diameter is slightly greater than the width of a grooved land 502 in the pilot valve spool 504. A concentric bore extension 506 is diametrically opposed to the bore 500 and is in the form of a blind bore of slightly smaller diameter than the length of the land 502. The land 502 has an annular groove 508 by which the bore 500 is connected to the bore extension 506. For small displacements of the spool 504 from its illustrated neutral position the land 502 controls only the bore 500. For some larger movements it controls also the bore 506, whereby a kink in the flow displacement characteristic is obtained.

We claim:

1. A device for controlling the pressure of fluid applied to a double acting hydraulic actuator responsively to an electrical input signal comprising fluid pressure operated main control valve means for regulating the fluid flow to and from the actuator, pilot valve means for controlling the main control valve means, said pilot valve means including spool means for regulating the fluid pressures for operating the main control valve means, transducer means for producing a first force dependent upon said electrical input signal and for applying said force to said spool means, piston means associated with said spool means and comprising substantially equal piston areas effective in opposite directions, and feedback means including shuttle valve means responsive to the direction of actuator movement against a load, said shuttle valve means comprising a housing having inlet ports and outlet ports and containing opposed pressure chambers, and a valve piston movable in said housing responsively to pressures in said opposed pressure chambers, said feedback means further including conduit means connecting said shuttle valve inlet ports to opposite sides of said actuator and conduit means connecting said opposed pressure chambers to a fluid outlet of said pilot valve means to connect the inlet ports alternately to the outlet ports such that one of the outlet ports is always subjected to the operating pressure at the side of the double acting actuator being supplied with fluid and the other is always subjected to the operating pressure at the side of the double acting actuator from which fluid is being withdrawn, said feedback means further comprising feedback conduit means connecting said shuttle valve outlet ports to said opposed piston areas for applying to said opposed piston areas a pressure differential dependent upon the magnitude of the fluid pressure difference operating on the actuator to apply to said spool means a second net force opposed to said first force.

2. A device according to claim 1 which further comprises means spring biasing said main control valve means to its neutral position.

3. A device according to claim 1 further comprising directional control valve means connected in series with said pilot valve means.

4. A device according to claim 3 further comprising second electrical transducer means for operating said directional control valve means.

5. A device according to claim 3 in which said directional control valve means is connected between said pilot valve means and said main control valve means.

6. A device according to claim 5 in which said pilot valve means comprises a three port valve.

7. A device according to claim 4 which is additionally adapted for controlling the flow of fluid to the hydraulic actuator responsively to a second electrical input signal and in which, for this purpose, said directional control valve means comprises an additional pilot valve control means for controlling said main control valve means, said additional pilot valve means including a flow pilot spool for controlling the fluid pressure for operating said main control valve means, said second electrical transducer means being adapted to produce a first force dependent upon said second electrical input signal and to apply said force to said flow pilot spool, an opposed piston arrangement associated with said flow pilot spool, flow sensing means for producing a pressure difference dependent upon the rate of fluid flow to the actuator, and additional feedback means for applying said pressure difference to said opposed piston arrangement to apply to said flow pilot spool a second force opposed to said first force, the first-mentioned and additional pilot valve means being arranged in series such that said first-mentioned pilot valve means is operative for pressure control when said second transducer means is set to override the feedback from the flow sensing means, at least below a predetermined maximum pressure, and said additional pilot valve means is operative for flow control when the first-mentioned transducer means is set to override the feedback from said shuttle valve means.

8. A device according to claim 7 in which said flow sensing means comprises a housing having at opposite ends thereof fluid connections connected in the flow path of the hydraulic fluid regulated by said main control valve means for operating said actuator, a movable member in said housing and dividing said housing into two chambers communicating respectively with said fluid connections, said housing and said movable member having cooperating surfaces thereon to define a fluid path interconnecting said two chambers and having a restricted flow cross section, said flow cross section being variable dependently upon the position of said movable member in said housing, and spring means biasing said movable member to a position in which said flow cross section is at a minimum, said movable member being movable against said spring means responsively to fluid pressure difference between said two chambers in a direction to increase said flow cross section.

9. A device according to claim 8 in which said cooperating surfaces are so shaped that the pressure difference between said two chambers is substantially directly proportional to the rate of fluid flow through said variable cross section.

10. A device according to claim 7 in which said additional pilot valve means is connected between said first-mentioned pilot valve means and said main control valve means.

* * * * *